United States Patent
Barnhouse, Jr. et al.

(10) Patent No.: US 10,240,594 B2
(45) Date of Patent: Mar. 26, 2019

(54) DYNAMIC SEAL CARTRIDGE IN A FLUID END OF A RECIPROCATING PUMP

(71) Applicant: Black Horse, LLC, Houston, TX (US)

(72) Inventors: James Anthony Barnhouse, Jr., Spring, TX (US); Jacob Brown, Rapid City, SD (US); Daryl Belshan, Tremont, IL (US)

(73) Assignee: BLACK HORSE, LLC, Houston, TX (US)

( * ) Notice: Subject to any disclaimer, the term of this patent is extended or adjusted under 35 U.S.C. 154(b) by 197 days.

(21) Appl. No.: 15/408,513

(22) Filed: Jan. 18, 2017

(65) Prior Publication Data

US 2018/0202434 A1  Jul. 19, 2018

(51) Int. Cl.
*F04B 53/02* (2006.01)
*F04B 19/22* (2006.01)
*F16J 15/18* (2006.01)
*F16J 15/3252* (2016.01)

(52) U.S. Cl.
CPC ............. *F04B 53/02* (2013.01); *F04B 19/22* (2013.01); *F16J 15/18* (2013.01); *F16J 15/3252* (2013.01)

(58) Field of Classification Search
CPC . F04B 53/02; F16J 15/18; F16J 15/188; F16J 15/189; F16J 15/3264; F16J 15/3256; F16J 15/3252
USPC ......................................... 277/510, 511, 520
See application file for complete search history.

(56) References Cited

U.S. PATENT DOCUMENTS

| | | | | |
|---|---|---|---|---|
| 162,192 A | * | 4/1875 | Reynolds | F16J 15/008 277/511 |
| 446,699 A | * | 2/1891 | Twining | F16J 15/182 277/515 |
| 1,780,764 A | * | 11/1930 | Noble | F16J 15/20 277/510 |
| 4,936,592 A | * | 6/1990 | Vaisanen | F16J 15/184 277/520 |
| 5,375,812 A | * | 12/1994 | Kent | F16J 15/18 251/214 |
| 8,100,407 B2 | * | 1/2012 | Stanton | F16J 15/183 166/105 |
| 2007/0273105 A1 | * | 11/2007 | Stanton | F04B 53/164 277/500 |
| 2010/0090409 A1 | * | 4/2010 | Sridhar | F16J 15/18 277/308 |
| 2012/0141308 A1 | * | 6/2012 | Saini | C08G 18/10 417/452 |
| 2012/0274030 A1 | * | 11/2012 | Crnkovich | F16J 15/185 277/520 |
| 2013/0319220 A1 | * | 12/2013 | Luharuka | F04B 53/164 92/165 R |

\* cited by examiner

*Primary Examiner* — Michael Leslie
*Assistant Examiner* — Matthew Wiblin
(74) *Attorney, Agent, or Firm* — MH2 Technology Law Group LLP (57) ABSTRACT

A seal assembly includes a packing nut and a pressure ring configured to be coupled to the packing nut. An inner surface of the pressure ring defines a first circumferential groove that is configured to receive a first seal. The first seal is configured to be inserted into the first circumferential groove before the packing nut is coupled to the pressure ring such that the first seal is inserted into the first circumferential groove without being substantially flexed.

20 Claims, 12 Drawing Sheets

DYNAMIC SEAL CARTRIDGE IN A FLUID END OF A RECIPROCATING PUMP

BACKGROUND

Hydraulic fracturing is a well-stimulation technique in which a high-pressure fluid is injected downhole to fracture a subterranean rock. More particularly, hydraulic fracturing involves injecting a high-pressure fluid into a wellbore to create cracks in the rock through which hydrocarbons (e.g., natural gas, petroleum) may flow into the wellbore more freely. The injected fluid may be pressurized by a pump at the surface. The pump may be, for example, a reciprocating pump that includes a power end and a fluid end. The fluid end includes a housing that defines a chamber. One or more plungers may move in a first direction, allowing a lower pressure fluid to flow into the chamber. The one or more plungers may then move in a second, opposing direction, which reduces the volume of the chamber and causes the fluid to flow out to the wellhead. When the flow area in the well is saturated, higher pressure is needed to push the flow through the restrictions caused by the rock formations, thus causing the pressure of the fluid in the chamber to increase.

One or more seals may be positioned (e.g., radially) between the plunger and the housing. The seals may prevent the pressurized fluid from leaking out between the plunger and the housing. The seals may exert a radially-outward force on the housing that may damage the housing. This is oftentimes referred to as a washboarding effect. In addition, the seals have a shorter lifespan than the housing. As a result, when the seals become worn, they may be replaced. However, the seals are part of a seal assembly that is difficult to disassemble from the housing when the seals need to be replaced. Thus, what is needed is an improved seal assembly for the housing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A seal assembly includes a packing nut and a pressure ring configured to be coupled to the packing nut. An inner surface of the pressure ring defines a first circumferential groove that is configured to receive a first seal. The first seal is configured to be inserted into the first circumferential groove before the packing nut is coupled to the pressure ring such that the first seal is inserted into the first circumferential groove without being substantially flexed.

A fluid end of a pump is also disclosed. The fluid end includes a body, a plunger, and a seal assembly. The body defines a plunger bore. The plunger is positioned at least partially within the plunger bore. The seal assembly is positioned at least partially radially-between the body and the plunger. The seal assembly includes a packing nut, a pressure ring, and a nose ring. The pressure ring is coupled to the packing nut. An inner surface of the pressure ring defines a first circumferential groove that is configured to receive a first seal. The first seal is configured to be inserted into the first circumferential groove before the packing nut is coupled to the pressure ring such that the first seal is inserted into the first circumferential groove without being substantially flexed. The nose ring is coupled to the pressure ring.

A method for assembling a seal assembly is also disclosed. The method includes inserting a first seal into a first circumferential groove formed in an inner surface of a pressure ring. The method also includes inserting an inner axial end of a packing nut at least partially into the pressure ring such that the first seal is positioned axially-between the inner axial end of the packing nut and a circumferential protrusion of the pressure ring. The method also includes coupling the packing nut to the pressure ring. The method also includes inserting a second seal into a second circumferential groove formed in the inner surface of the pressure ring. The method also includes inserting an outer axial end of a nose ring at least partially into the pressure ring such that the second seal is positioned axially-between the outer axial end of the nose ring and the circumferential protrusion of the pressure ring.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying figures. In the following detailed description, numerous specific details are set forth in order to provide a thorough understanding of the present disclosure. However, it will be apparent to one of ordinary skill in the art that the system and method disclosed herein may be practiced without these specific details.

Figure 1:
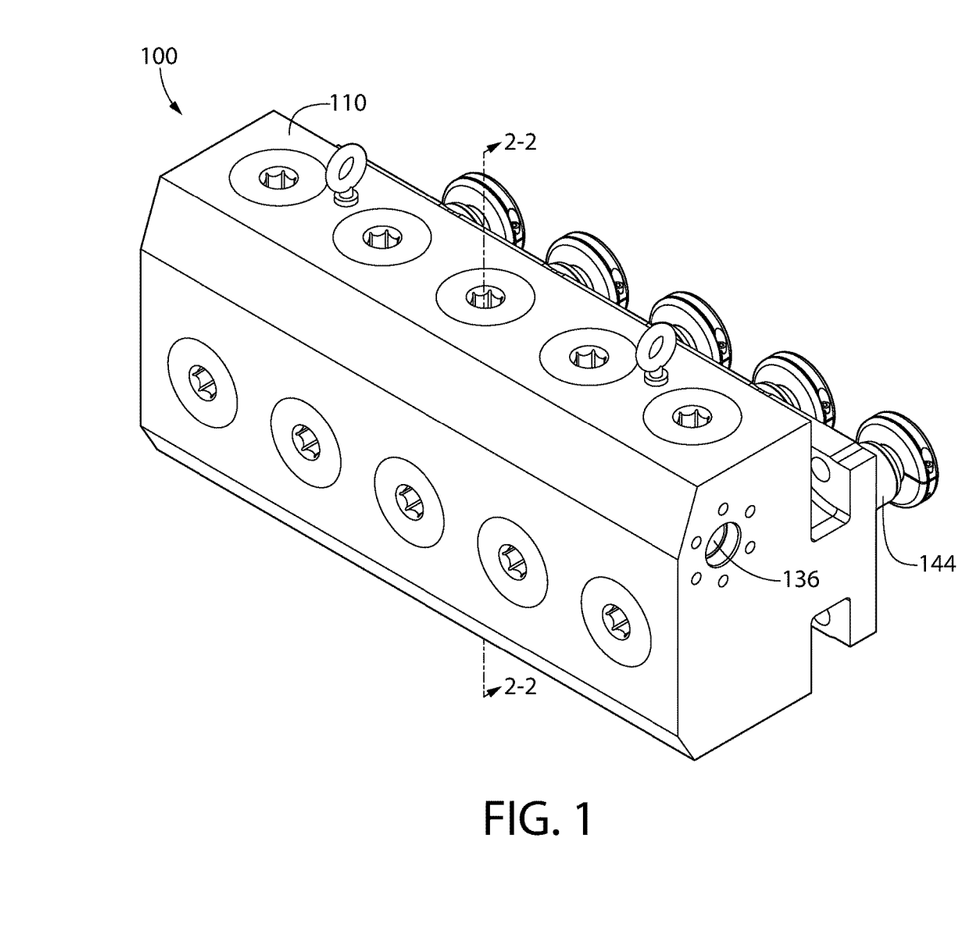
FIG. 1 illustrates a perspective view of a fluid end of a pump, according to an embodiment.

FIG. 1 illustrates a perspective view of a fluid end 100 of a pump, according to an embodiment. The fluid end 100 may include a body (also referred to as a block) 110. The body 110 may be made of steel (e.g., alloy steel). One or more plungers (five are shown: 144) may be positioned at least partially within the body 110. The plungers 144 may also be coupled to a power end of the pump (not shown), which may cause the plungers 144 to move axially back and forth (i.e., reciprocate) within the body 110.

Figure 2:
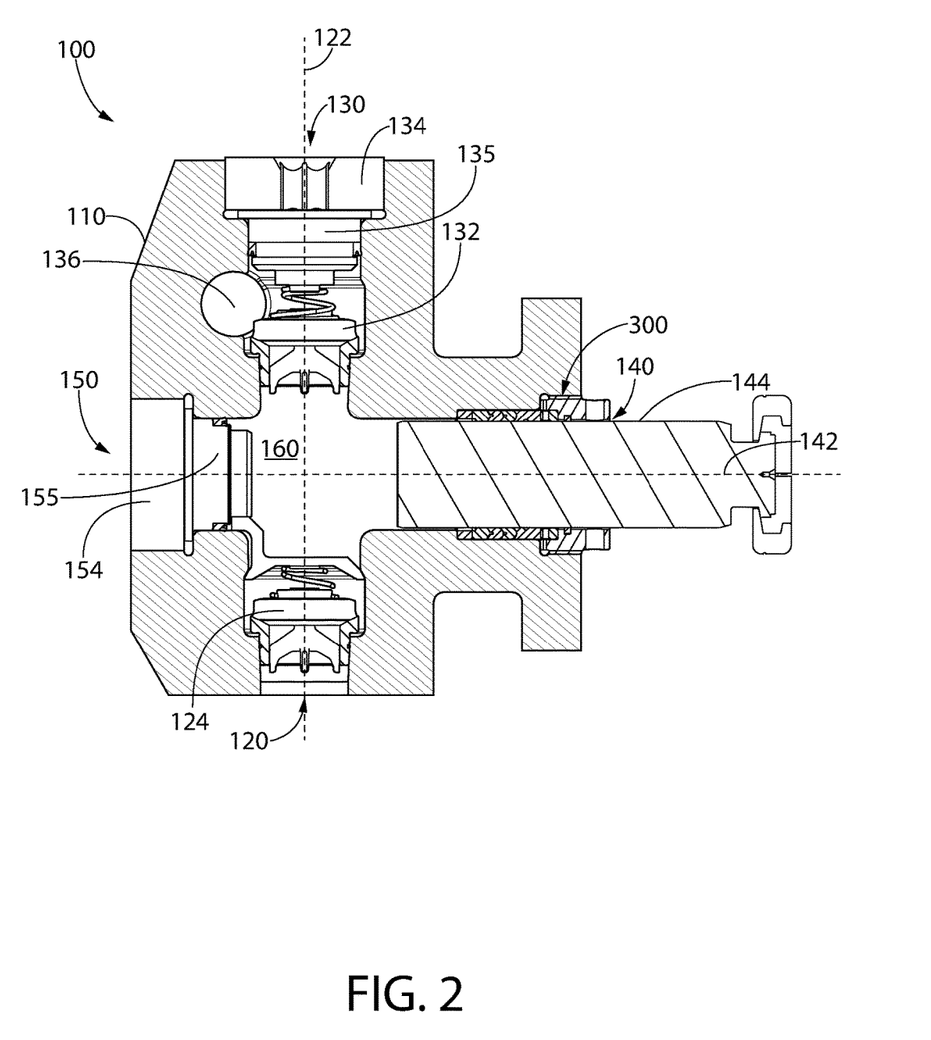
FIG. 2 illustrates a cross-sectional side view of the fluid end taken through line 2-2 in FIG. 1, according to an embodiment.

FIG. 2 illustrates a cross-sectional side view of the fluid end 100 taken through line 2-2 in FIG. 1, according to an embodiment. The body 110 may define intersecting bores. More particularly, the body 110 may define a suction bore 120, a discharge bore 130, a plunger bore 140, and an access bore 150. The suction bore 120 and the discharge bore 130 may be aligned such that they share a common central longitudinal axis 122. The plunger bore 140 and the access bore 150 may also be aligned such that they share a common central longitudinal axis 142. The central longitudinal axis 122 through the suction bore 120 and the discharge bore 130 may be substantially perpendicular to the central longitudinal axis 142 through the plunger bore 140 and the access bore 150. A chamber 160 may be positioned at the intersection of the bores 120, 130, 140, 150. The chamber 160 may be or include the volume where the bores 120, 130, 140, 150 overlap.

A first check valve 124 may be positioned in the suction bore 120. The first check valve 124 may allow fluid to flow therethrough in one direction but prevent the fluid from flowing therethrough in the opposing direction. More particularly, fluid may flow upward through the first check valve 124 and into the chamber 160 when a pressure differential across the first check valve 124 exceeds a predetermined amount.

A second check valve 132 may be positioned in the discharge bore 130. The second check valve 132 may also allow fluid to flow therethrough in one direction but prevent the fluid from flowing therethrough in the opposing direction. More particularly, the fluid may flow upward through the second check valve 132 to exit the chamber 160 when a pressure differential across the second check valve 132 exceeds a predetermined amount.

A nut 134 and discharge cover 135 may also be positioned at least partially in the discharge bore 130. The nut 134 and discharge cover 135 may retain the fluid and allow for access into the body 110. A nut 154 and access cover 155 may be positioned at last partially in the access bore 150. The nut 154 and access cover 155 may retain the fluid and allow for access into the body 110.

The plunger 144 may be positioned at least partially in the plunger bore 140. As described above, an end of the plunger 144 may be coupled to the power end of the pump, which may cause the plunger 144 to move axially back and forth (i.e., reciprocate) within the plunger bore 140. One or more seals 146 may be positioned (e.g., radially) between the plunger 144 and the body 110. A lower pressure fluid is available in bore suction 120, and when the plunger 144 moves away from the chamber 160 (e.g., to the right in FIG. 2), a pressure differential is created across the first check valve 124. This may cause the fluid to flow from the suction bore 120, through the first check valve 124, and into the chamber 160. When the plunger 144 then moves back toward the chamber 160 (e.g., to the left in FIG. 2), a pressure differential is created across the second check valve 132. This may cause the fluid to flow from the chamber 160, through the second check valve 132, through the discharge bore 130, and out the discharge rail 136. The pressurized fluid may then be introduced into a wellbore after it exits the fluid end 100.

Figure 3:
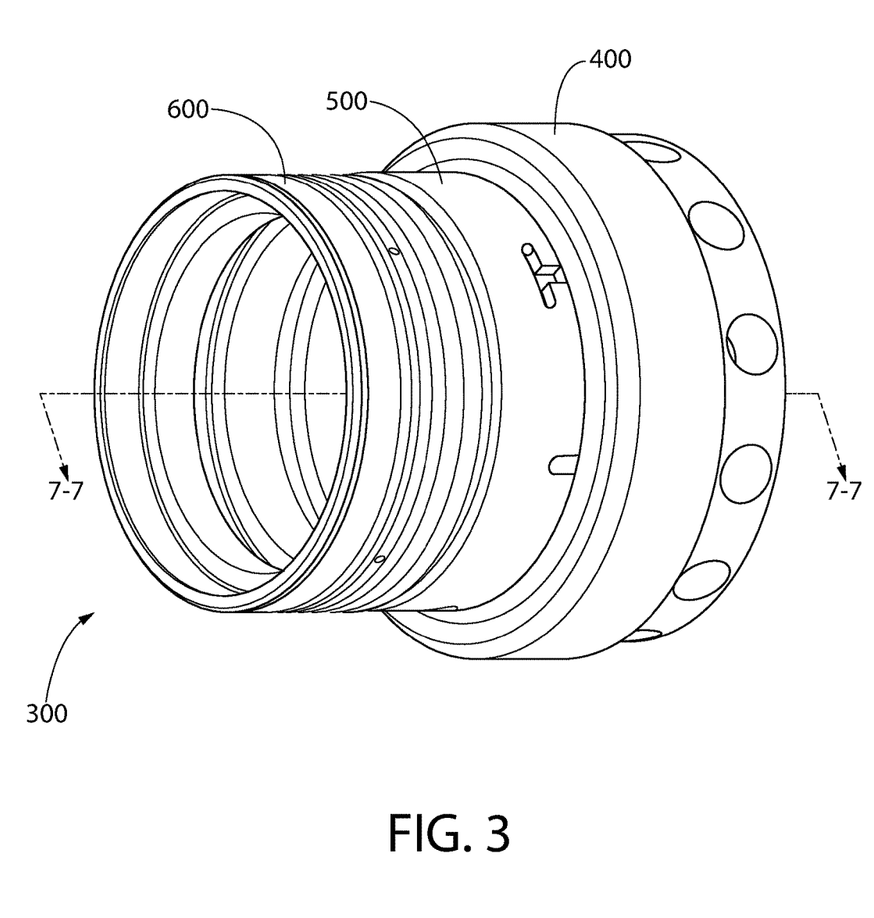
FIG. 3 illustrates a perspective view of a seal assembly that may be positioned at least partially within the fluid end, according to an embodiment.

FIG. 3 illustrates a perspective view of the seal assembly 300, according to an embodiment. The seal assembly 300 may include a single, integral component, or the seal assembly 300 may include multiple components that are coupled together. As shown, the seal assembly 300 includes a packing nut (also referred to as a retaining nut) 400, a pressure ring 500, and a nose ring 600. The packing nut 400, the pressure ring 500, and the nose ring 600 may be made of one or more metals (e.g., steel). The packing nut 400 may be coupled to or integral with the pressure ring 500, and the pressure ring 500 may be coupled to or integral with the nose ring 600. Various embodiments for coupling the packing nut 400, the pressure ring 500, and the nose ring 600 together are discussed in greater detail below.

Figure 4:
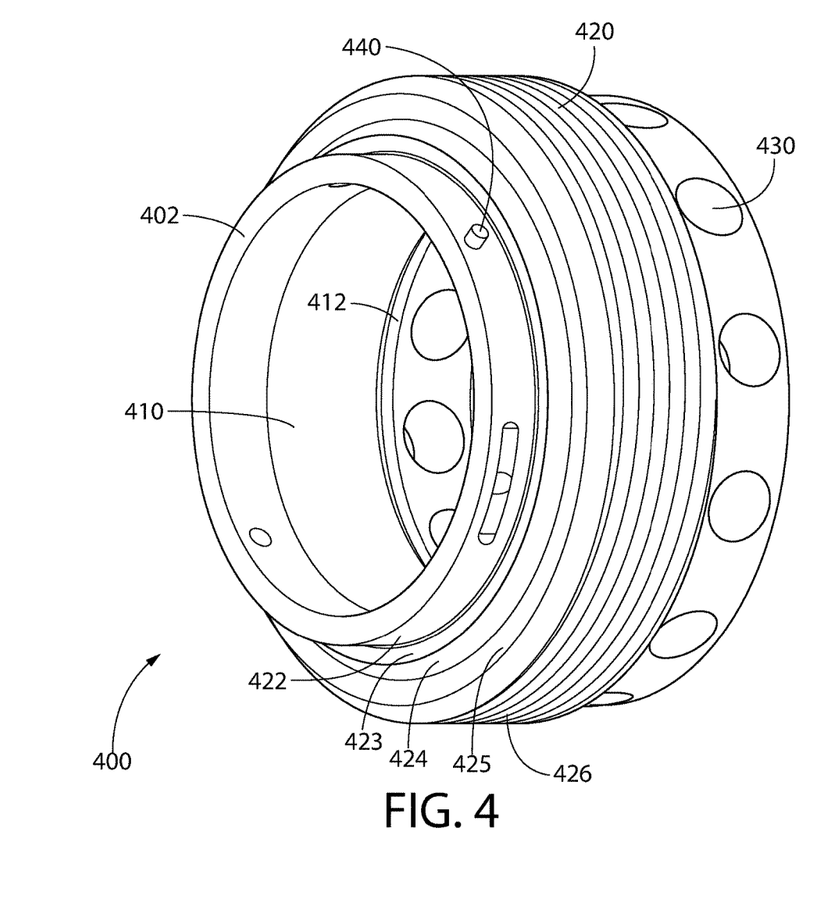
FIG. 4 illustrates a perspective view of a packing nut of the seal assembly, according to an embodiment.

FIG. 4 illustrates a perspective view of the packing nut 400 of the seal assembly 300, according to an embodiment. The packing nut 400 may be or include an annular ring having an inner surface 410 and an outer surface 420. The packing nut 400 may define one or more bores (e.g., radial bores) 430 that extend from the inner surface 410 to the outer surface 420. The bores 430 may be configured to receive a tool (e.g., a rod) that is used to rotate the seal assembly 300 to couple (e.g., screw) the seal assembly 300 to the body 110 of the fluid end 100.

The inner surface 410 of the packing nut 400 may include one or more circumferential grooves (one is shown: 412). An annular seal 413 (shown in FIG. 7) may be positioned within the circumferential groove 412. The seal 413 may prevent pressurized fluid from flowing between the plunger 144 and the packing nut 400.

The outer surface 420 of the packing nut 400 may include a first diameter portion 422, a second diameter portion 424, and a third diameter portion 426, proceeding from an inner axial end 402 of the packing nut 400 toward an outer axial end 404 of the packing nut 400. The first diameter portion 422 may have a smaller diameter than the second diameter portion 424, forming a first axial shoulder 423 therebetween. The first axial shoulder 423 may be configured to contact the pressure ring 500 when the packing nut 400 is coupled to the pressure ring 500. The second diameter portion 424 may have a smaller diameter than the third diameter portion 426, forming a second axial shoulder 425 therebetween. The second axial shoulder 425 may be configured to contact the body 110 of the fluid end 100, or be slightly spaced apart therefrom, when the seal assembly 300 is coupled to the body 110.

As shown, in one embodiment, the first diameter portion 422 may include one or more coupling features 440 positioned proximate to the inner axial end 402 of the packing nut 400. When more than one coupling feature 440 is present, the coupling features 440 may be circumferentially-offset from one another. As shown, the coupling features 440 may be protrusions (e.g., pins) that extend radially-outward from the first diameter portion 422. The coupling features 440 may be used to couple the packing nut 400 to the pressure ring 500, as described in greater detail below.

Figure 5:
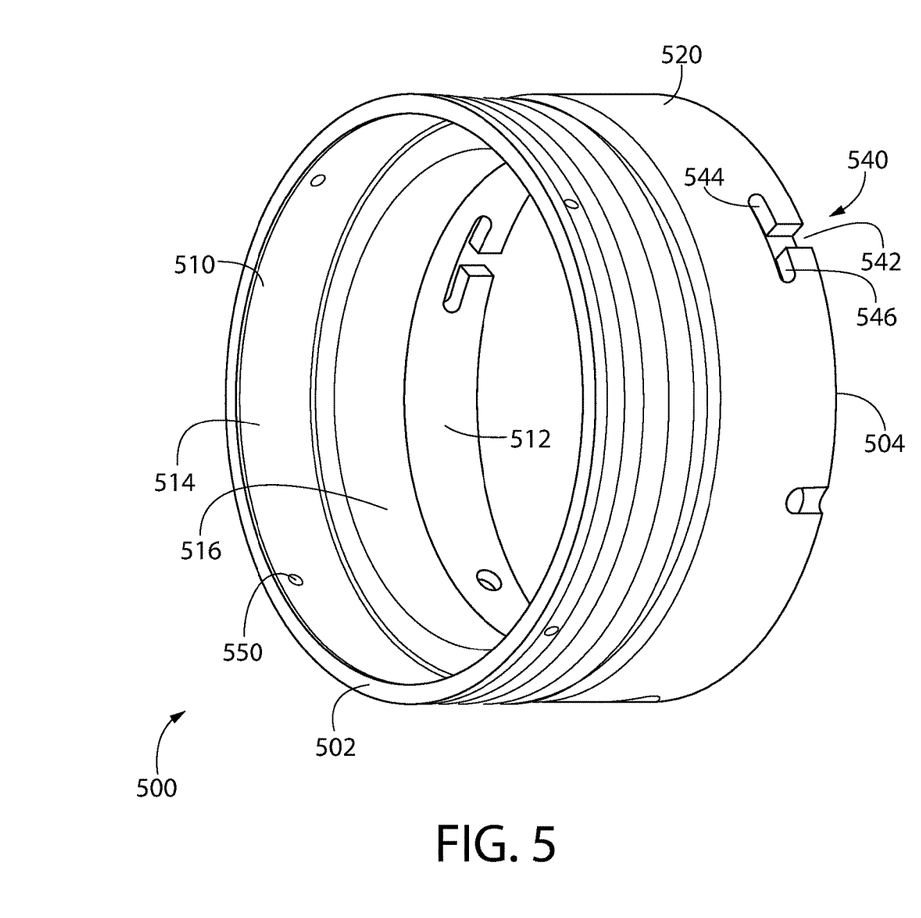
FIG. 5 illustrates a perspective view of a pressure ring of the seal assembly, according to an embodiment.

FIG. 5 illustrates a perspective view of a pressure ring 500 of the seal assembly 300, according to an embodiment. The pressure ring 500 may be or include an annular ring having an inner surface 510 and an outer surface 520. The inner surface 510 may include one or more circumferential grooves. As shown the inner surface 510 includes two circumferential grooves 512, 514 that are separated by a circumferential protrusion 516. The circumferential protrusion 516 extends radially-inward from the inner surface 510. A first annular seal 513 (shown in FIG. 7) may be positioned within the first circumferential groove 512, and a second annular seal 515 (shown in FIG. 7) may be positioned within the second circumferential groove 514. The seals 513, 515 may prevent pressurized fluid from flowing between the plunger 144 and the pressure ring 500.

The pressure ring 500 may also include one or more first coupling features 540 positioned proximate to an outer axial end 504 of the pressure ring 500. When more than one first coupling feature 540 is present, the first coupling features 540 may be circumferentially-offset from one another. As shown, the first coupling features 540 may be or include grooves. The grooves may extend from the inner surface 510 to the outer surface 520 of the pressure ring 500. Each groove may include an axial portion 542 and one or more circumferential portions (two are shown: 544, 546). Thus, each groove may be substantially L-shaped or substantially T-shaped. Although the coupling features 440 on the packing nut 400 are shown as protrusions, and the first coupling features 540 on the pressure ring 500 are shown as grooves, it will be appreciated that in another embodiment, the coupling features 440 on the packing nut 400 may be grooves, and the first coupling features 540 on the pressure ring 500 may be protrusions. The pressure ring 500 and the nose ring 600 may be coupled together using either of the embodiments disclosed above or in another manner, as disclosed below.

The pressure ring 500 may also include one or more second coupling features 550 positioned proximate to the inner axial end 502 of the pressure ring 500. When more than one second coupling feature 550 is present, the second coupling features 550 may be circumferentially-offset from one another. As shown, the second coupling features 550 may be or include radial bores that extend from the inner surface 510 to the outer surface 520 of the pressure ring 500.

Figure 6:
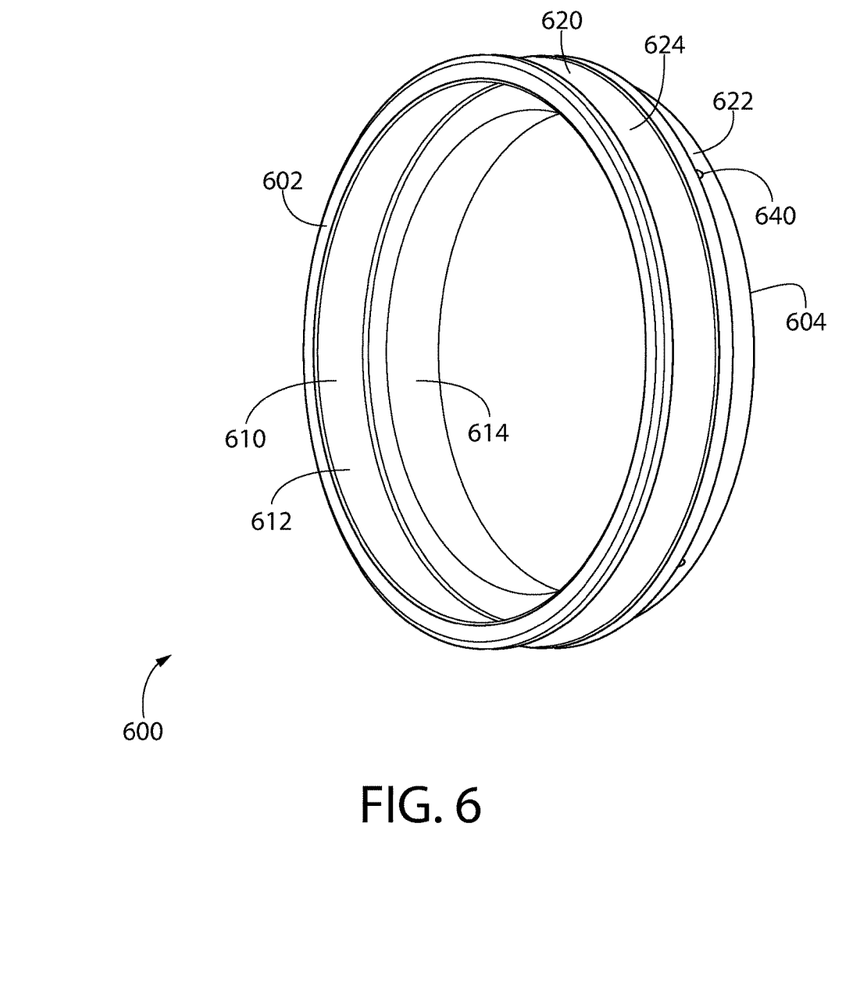
FIG. 6 illustrates a perspective view of a nose ring of the seal assembly, according to an embodiment.

FIG. 6 illustrates a perspective view of the nose ring 600 of the seal assembly 300, according to an embodiment. The nose ring 600 may be or include an annular ring having an inner surface 610 and an outer surface 620. The inner surface 610 may include one or more circumferential grooves (one is shown: 612) and one or more circumferential protrusions (one is shown: 614). An annular seal 613 (shown in FIG. 7) may be positioned within the circumferential groove 612. The seal 613 may prevent pressurized fluid from flowing between the plunger 144 and the nose ring 600. The circumferential protrusion 614 extends radially-inward from the inner surface 610.

The outer surface 620 of the nose ring 600 may include a first diameter portion 622 and a second diameter portion 624, proceeding from an outer axial end 604 of the nose ring 600 toward an inner axial end 602 of the nose ring 600. The first diameter portion 622 may have a smaller diameter than the second diameter portion 624. As shown, in one embodiment, the first diameter portion 622 may include one or more coupling features 640. When more than one coupling feature 640 is present, the coupling features 640 may be circumferentially-offset from one another. As shown, the coupling features 640 may be or include radial bores that extend from the outer surface 620 at least partially radially-through the nose ring 600 toward the inner surface 610. For example, the radial bores may not extend all the way through to the inner surface 610.

Figure 7:
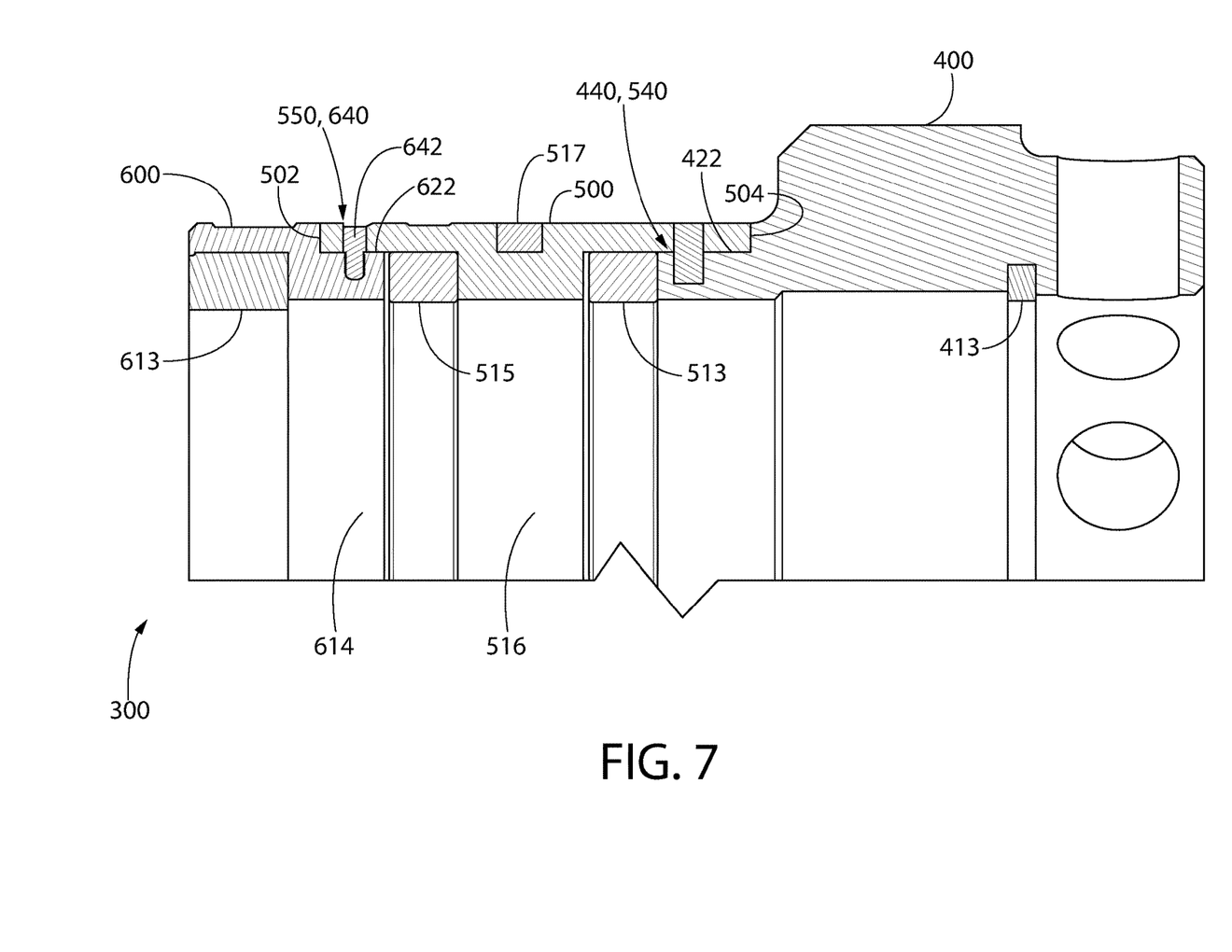
FIG. 7 illustrates a partial cross-sectional view of the seal assembly, according to an embodiment.

FIG. 7 illustrates a partial cross-sectional view of the seal assembly 300, according to an embodiment. The first diameter portion 422 of the packing nut 400 may positioned at least partially within the outer axial end 504 of the pressure ring 500. The coupling features (e.g., radial protrusions) 440 of the packing nut 400 may be coupled to and/or engaged with the first coupling features (e.g., grooves) 540 of the pressure ring 500 to couple the packing nut 400 to the pressure ring 500. The first diameter portion 622 of the nose ring 600 may be positioned at least partially within the inner axial end 502 of the pressure ring 500. The second coupling features (e.g., radial bores) 550 of the pressure ring 500 may be coupled to and/or engaged with the coupling features (e.g., radial bores) 640 of the nose ring 600 to couple the pressure ring 500 to the nose ring 600. For example, a coupling member (e.g., a radial pin) 642 may be inserted into the aligned coupling features 550, 640 to couple the pressure ring 500 to the nose ring 600.

The first seal 413 may be positioned within the circumferential groove 412 in the packing nut 400. The second seal 513 may be positioned within the first circumferential groove 512 in the pressure ring 500. The third seal 515 may be positioned within the second circumferential groove 514 in the pressure ring 500. The fourth seal 613 may be positioned within the circumferential groove 612 of the nose ring 600. The circumferential protrusion 516 in the pressure ring 500 may be positioned axially-between the second and third seals 513, 515. The circumferential protrusion 614 in the nose ring 600 may be positioned axially-between the third and fourth seals 515, 613. Inner diameters of the seals 413, 513, 515, 613 may be substantially equal to, or slightly less than, inner diameters of the circumferential protrusions 516, 614. The inner diameters of the seals 413, 513, 515, 613 may be substantially equal to the outer diameter of the plunger 144 so as to form a fluid-tight seal therewith.

A fifth seal 517 may be positioned within a circumferential groove formed in the outer surface of the pressure ring 500. The fifth seal 517 may restrict fluid pressure from leaking between the seal assembly 300 (e.g., the pressure ring 500) and the body 110 of the fluid end 100.

Figure 8:
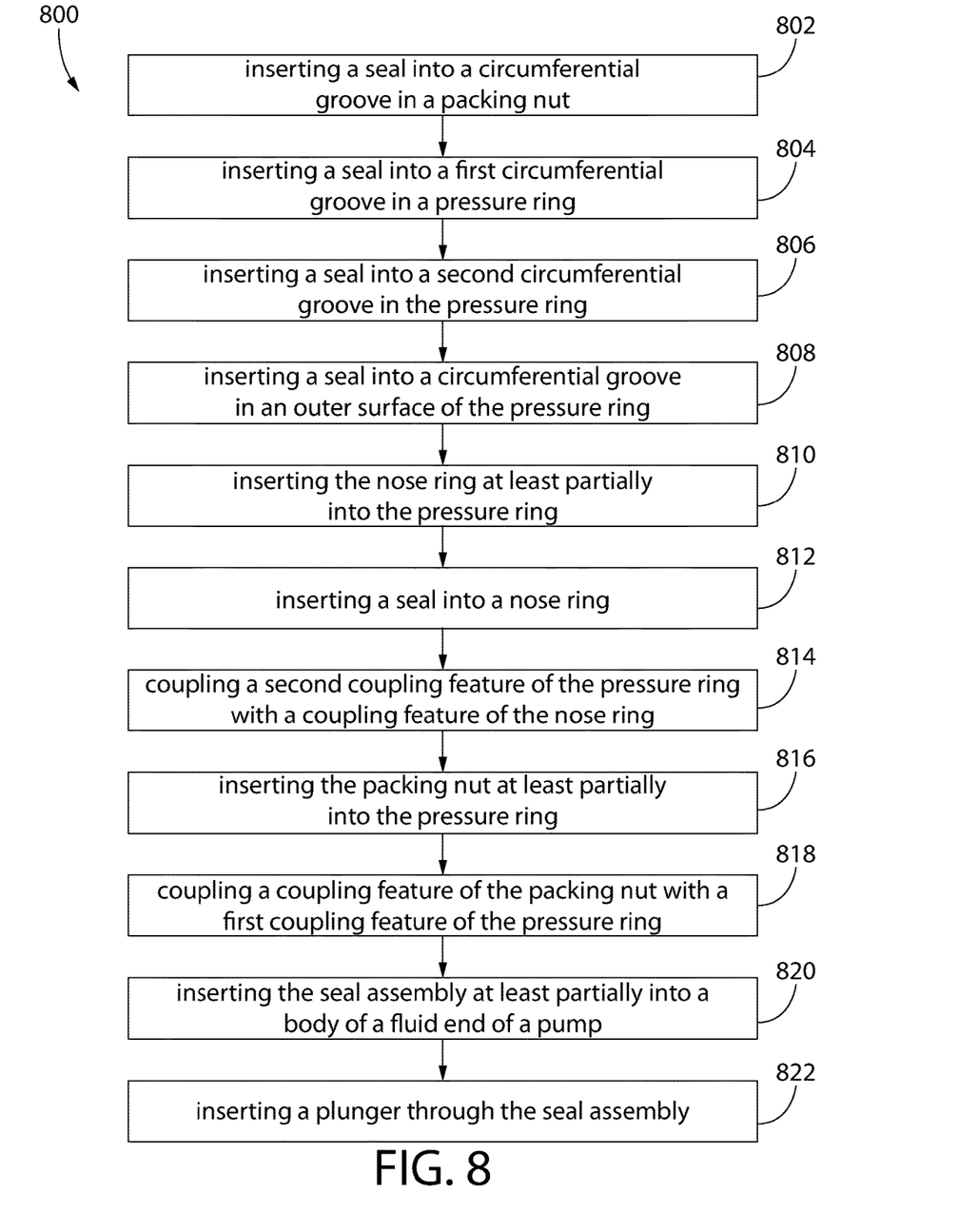
FIG. 8 illustrates a flowchart of a method for assembling the seal assembly, according to an embodiment.

FIG. 8 illustrates a flowchart of a method 800 for assembling the seal assembly 300, according to an embodiment. The method 800 may be viewed together with FIGS. 1-7. As will be appreciated, the method 800 may be performed in any order, and the order of steps provided below is merely one example. In addition, one or more of the steps may be omitted or combined with another one of the steps.

The method 800 may include inserting the first seal 413 into the circumferential groove 412 in the packing nut 400, as at 802. The first seal 413 may be flexible such that it may be bent or flexed to insert the first seal 413 into the circumferential groove 412. The method 800 may also include inserting the second seal 513 into the first circumferential groove 512 in the pressure ring 500, as at 804. The second seal 513 may be less flexible than the first seal 413. Due to the design of the seal assembly 300, the second seal 513 may be inserted into the first circumferential groove 512 without being substantially bent or flexed. The method 800 may also include inserting the third seal 515 into the second circumferential groove 514 in the pressure ring 500, as at 806. The third seal 515 may be less flexible than the first seal 413. Due to the design of the seal assembly 300, the third seal 515 may be inserted into the second circumferential groove 514 without being substantially bent or flexed. The method may also include inserting the fifth seal 517 into the circumferential groove in the outer surface of the pressure ring 500, as at 808.

The method 800 may also include inserting the nose ring 600 at least partially into the pressure ring 500, as at 810. More particularly, the outer axial end 604 of the nose ring 600 may be inserted at least partially into the inner axial end 502 of the pressure ring 500 such that the first diameter portion 622 of the nose ring 600 is positioned within the second circumferential groove 514 of the pressure ring 500. As a result, the third seal 515 may be positioned axially-between the inner axial end 602 of the nose ring 600 and the circumferential protrusion 516 of the pressure ring 500.

The method 800 may also include inserting the fourth seal 613 into the circumferential groove 612 in the nose ring 600, as at 812. The fourth seal 613 may be less flexible than the first seal 413. Due to the design of the seal assembly 300, the fourth seal 613 may be inserted into the circumferential groove 612 without being substantially bent or flexed.

The method 800 may also include coupling/engaging the second coupling features 550 of the pressure ring 500 with the coupling features 640 of the nose ring 600, as at 814. In the embodiment shown in FIGS. 1-7, this may include inserting the coupling member 642 into the aligned coupling features (e.g., radial bores) 550, 640, thereby preventing the pressure ring 500 and the nose ring 600 from being pulled axially-apart.

The method 800 may also include inserting the packing nut 400 at least partially into the pressure ring 500, as at 816. More particularly, the inner axial end 402 of the packing nut 400 may be inserted at least partially into the outer axial end 504 of the pressure ring 500 such that the first diameter portion 422 of the packing nut 400 is positioned within the first circumferential groove 512 of the pressure ring 500. As a result, the second seal 513 may be positioned axially-between the inner axial end 402 of the packing nut 400 and the circumferential protrusion 516 of the pressure ring 500.

As the packing nut 400 is inserted at least partially into the pressure ring 500, the method 800 may also include coupling/engaging the coupling features 440 of the packing nut 400 with the first coupling features 540 of the pressure ring 500, as at 818. In the embodiment shown in FIGS. 1-7, the coupling may include inserting the coupling features (e.g., protrusions) 440 of the packing nut 400 into the axial portions 542 of the first coupling features 540 of the pressure ring 500. The coupling may also include rotating the packing nut 400 with respect to the pressure ring 500. This may cause the coupling features (e.g., protrusions) 440 of the packing nut 400 to slide into the first circumferential portions 544 of the first coupling features (e.g., grooves) 540 of the pressure ring 500, thereby preventing the packing nut 400 and the pressure ring 500 from being pulled axially-apart.

The method 800 may also include inserting the seal assembly 300 at least partially into the body 110 of the fluid end 100, as at 820. Inserting the seal assembly 300 may include rotation the seal assembly 300 such that threads on the outer surface of the seal assembly 300 engage the corresponding threads on the body 110. The method 800 may also include inserting the plunger 144 through the seal assembly 300, as at 822. Thus, the seal assembly 300 may be positioned radially-between the plunger 144 and the body 110. The seals 413, 513, 515, 613 may engage the outer surface of the plunger 144.

When the plunger 144 compresses the fluid in the body 110, the seals 413, 513, 515, 613 may prevent the pressurized fluid from leaking between the plunger 144 and the body 110. As the pressure of the fluid in the body 110 increases, the radially-outward force exerted by the seals 413, 513, 515, 613 may also increase. However, as may be seen, the seals 413, 513, 515, 613 may not be in direct contact with the inner surface of the body 110 of the fluid end 100 that defines the plunger bore 140. Rather, the pressure ring 500 may be positioned radially-between the second and third seals 513, 515 and the body 110, and the nose ring 600 may be positioned radially-between the fourth seal 613 and the body 110.

As may be seen in FIG. 7, the outer surface of the pressure ring 500 may have a greater surface area than the outer surfaces of the second and third seals 513, 515. Similarly, the outer surface of the nose ring 600 may have a greater surface area than the outer surface of the fourth seal 613. As a result, the radially-outward force exerted by the second and third seals 513, 515 may be spread over a greater surface area on the inner surface of the body 110 by the seal assembly 300. This may reduce or prevent damage to the inner surface of the body 110 caused by the radially-outward force exerted by the seals 513, 515, 613.

Figure 9:
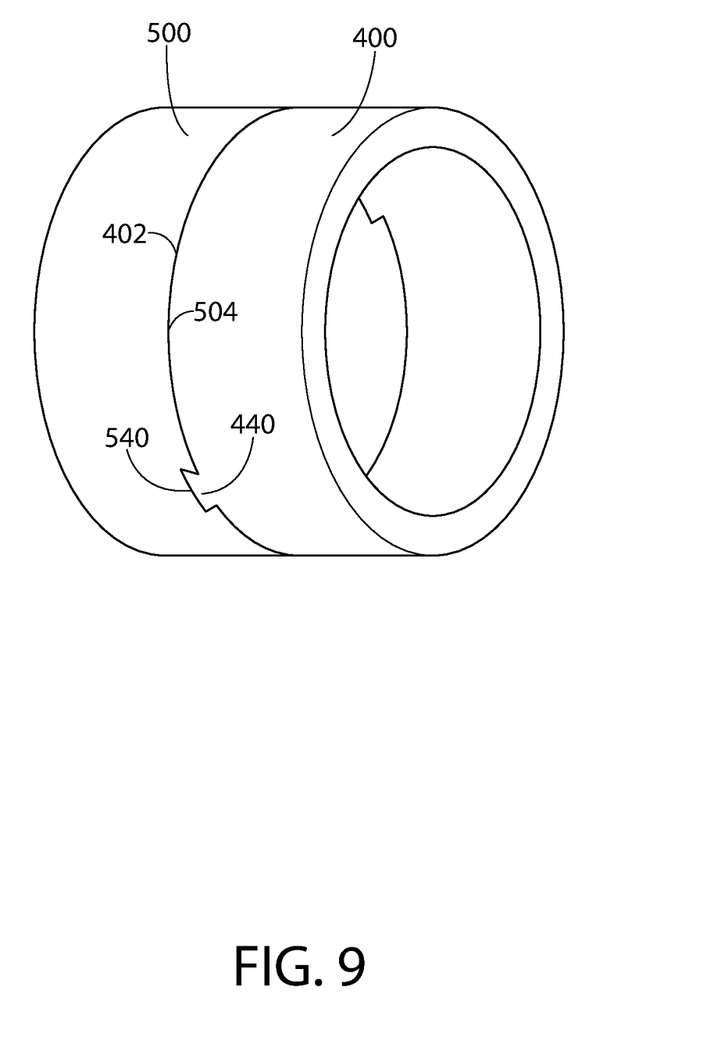
FIG. 9 illustrates a perspective view of a portion of the packing nut and a portion of the pressure ring showing another way to couple the packing nut to the pressure ring, according to an embodiment.

FIGS. 9, 10A, 10B, 11A, 11B, 12A, and 12B illustrate various ways to couple the packing nut 400 and the pressure ring 500 together. As will be appreciated, the pressure nut 500 and the nose ring 600 may be coupled together using any of these ways or another way may be used. FIG. 9 illustrates a perspective view of a portion of the packing nut 400 and a portion of the pressure ring 500 showing another way to couple the packing nut 400 to the pressure ring 500, according to an embodiment. The coupling feature 440 of the packing nut 400 may include a dovetail-shaped protrusion that extends axially from the inner axial end 402 of the packing nut 400. The first coupling feature 540 of the pressure ring 500 may include a corresponding dovetail-shaped recess that extends axially from the outer axial end 504 of the pressure ring 500. Thus, the packing nut 400 may be coupled to the pressure ring 500 by moving the packing nut 400 laterally with respect to the pressure ring 500 to insert the dovetail-shaped protrusion into the dovetail-shaped recess. As will be appreciated, in another embodiment, the packing nut 400 may include the dovetail-shaped recess, and the pressure ring 500 may include the dovetail-shaped protrusion. The engagement of the dovetail-shaped protrusion and the dovetail-shaped recess may prevent the packing nut 400 and the pressure ring 500 from being pulled axially-apart from one another.

Figure 10A:
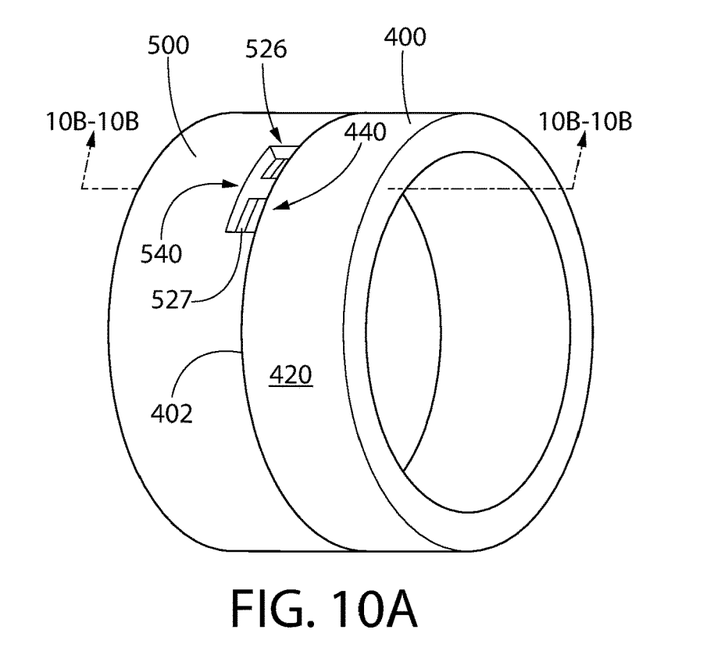
FIG. 10A illustrates a perspective view of a portion of the packing nut and a portion of the pressure ring showing yet another way to couple the packing nut to the pressure ring, according to an embodiment.
Figure 10B:
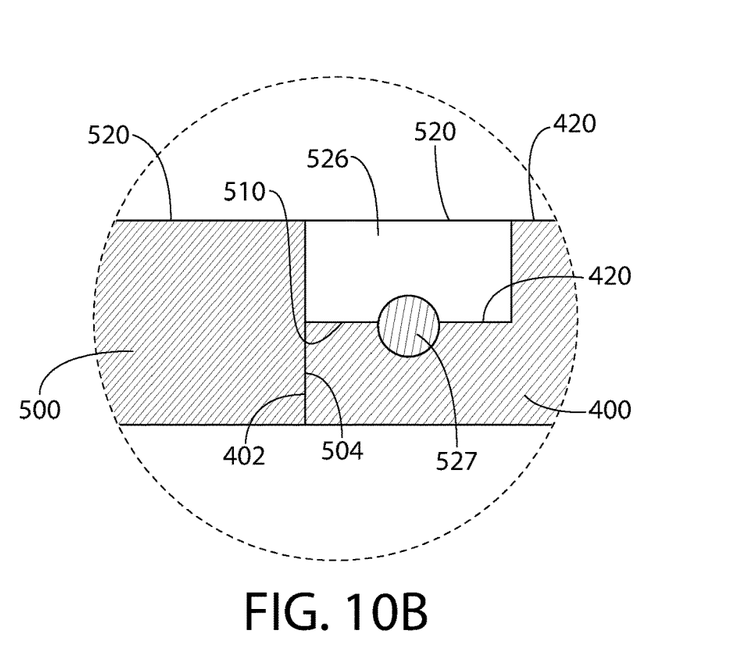
FIG. 10B illustrates a cross-sectional side view of a portion of FIG. 10A, according to an embodiment.

FIG. 10A illustrates a perspective view of a portion of the packing nut 400 and a portion of the pressure ring 500 showing yet another way to couple the packing nut 400 to the pressure ring 500, and FIG. 10B illustrates a cross-sectional side view of a portion of FIG. 10A, according to an embodiment. The coupling feature 440 of the packing nut 400 may include a circumferential groove formed in the outer surface 420 of the packing nut 400 proximate to the inner axial end 402 of the packing nut 400. The first coupling feature 540 of the pressure ring 500 may include a circumferential groove formed in the inner surface 510 of the pressure ring 500 proximate to the outer axial end 504 of the pressure ring 500.

When the inner axial end 402 of the packing nut 400 is inserted at least partially into the outer axial end 504 of the pressure ring 500, the circumferential grooves may be axially-aligned with one another. The outer surface 520 of the pressure ring 500 may also include a radial recess 526 that may allow a coupling member 527 to be inserted into the aligned circumferential grooves. As shown, the coupling member 527 may be or include a flexible metallic cable. As may be seen in FIG. 10B, the coupling member 527 at least partially radially-overlap with both the packing nut 400 and the pressure ring 500, thereby preventing the packing nut 400 and the pressure ring 500 from being pulled axially-apart from one another.

Figure 11A:
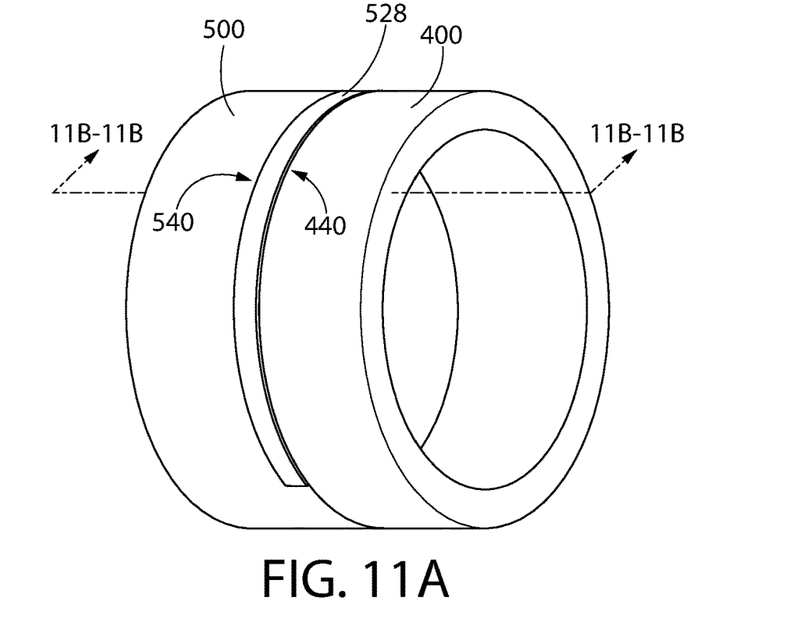
FIG. 11A illustrates a perspective view of a portion of the packing nut and a portion of the pressure ring showing yet another way to couple the packing nut to the pressure ring, according to an embodiment.
Figure 11B:
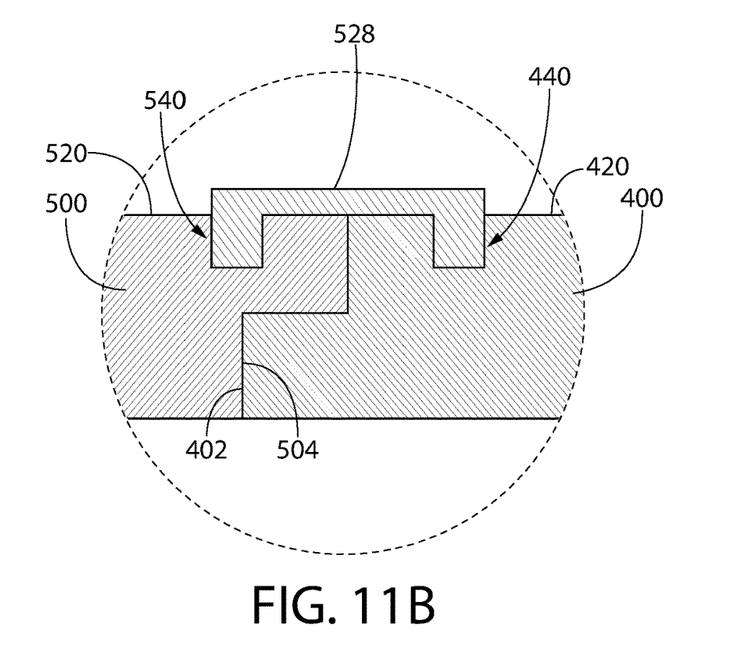
FIG. 11B illustrates a cross-sectional side view of a portion of FIG. 11A, according to an embodiment.

FIG. 11A illustrates a perspective view of a portion of the packing nut 400 and a portion of the pressure ring 500 showing yet another way to couple the packing nut 400 to the pressure ring 500, and FIG. 11B illustrates a cross-sectional side view of a portion of FIG. 11A, according to an embodiment. The coupling feature 440 of the packing nut 400 may include a circumferential groove formed in the outer surface 420 of the packing nut 400 proximate to the inner axial end 402 of the packing nut 400. The first coupling feature 540 of the pressure ring 500 may include a circumferential groove formed in the outer surface 520 of the pressure ring 500 proximate to the outer axial end 504 of the pressure ring 500.

When the inner axial end 402 of the packing nut 400 is inserted at least partially into the outer axial end 504 of the pressure ring 500, the circumferential grooves may be axially-offset from one another. A coupling member 528 to be inserted into the circumferential grooves. As shown, the coupling member 828 may be or include an at least partially annular ring having a substantially U-shaped cross-sectional shape. When inserted into the circumferential grooves, the coupling member 528 may prevent the packing nut 400 and the pressure ring 500 from being pulled axially-apart from one another.

Figure 12A:
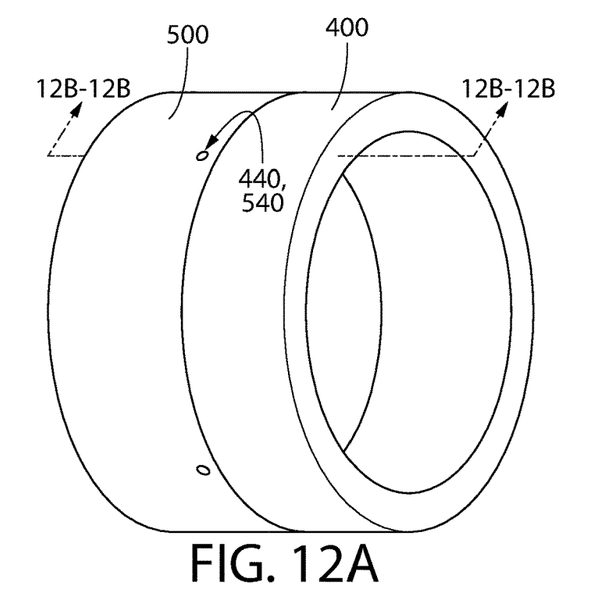
FIG. 12A illustrates a perspective view of a portion of the packing nut and a portion of the pressure ring showing yet another way to couple the packing nut to the pressure ring, according to an embodiment.
Figure 12B:
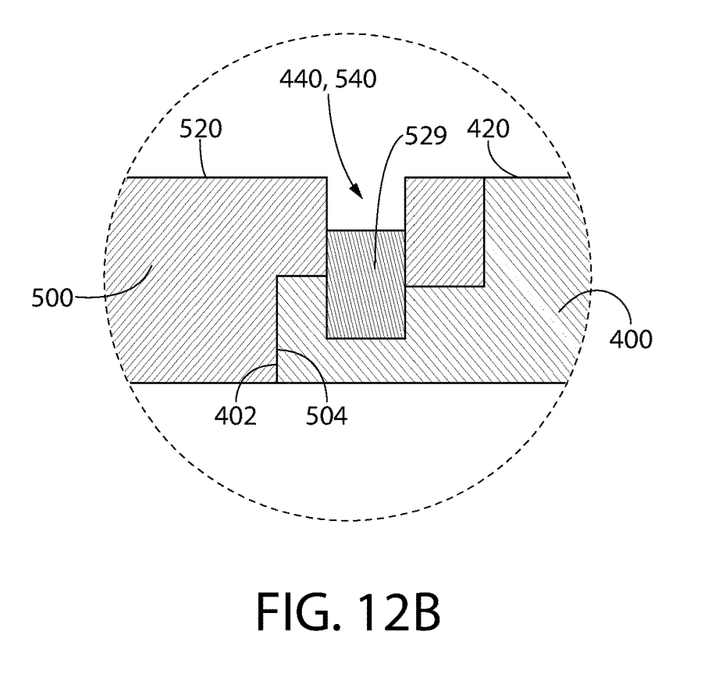
FIG. 12B illustrates a cross-sectional side view of a portion of FIG. 12A, according to an embodiment

FIG. 12A illustrates a perspective view of a portion of the packing nut 400 and a portion of the pressure ring 500 showing yet another way to couple the packing nut 400 to the pressure ring 500, and FIG. 12B illustrates a cross-sectional side view of a portion of FIG. 12A, according to an embodiment. The coupling feature 440 of the packing nut 400 may include a radial bore formed in the outer surface 420 of the packing nut 400 proximate to the inner axial end 402 of the packing nut 400. The first coupling feature 540 of the pressure ring 500 may include a radial bore formed in the outer surface 520 of the pressure ring 500 proximate to the outer axial end 504 of the pressure ring 500.

When the inner axial end 402 of the packing nut 400 is inserted at least partially into the outer axial end 504 of the pressure ring 500, the radial bores may be aligned with one another. A coupling member 529 may then be inserted into the aligned radial bores. As shown, the coupling member 529 may be or include a radial pin. When the coupling member 529 is positioned within the radial bores, the coupling member 529 may prevent the packing nut 400 and the pressure ring 500 from being pulled axially-apart from one another. As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A seal assembly, comprising:
a packing nut; and
a pressure ring configured to be coupled to the packing nut, wherein an inner surface of the pressure ring defines a first circumferential groove that is configured to receive a first seal, and wherein the first seal is configured to be inserted into the first circumferential groove before the packing nut is coupled to the pressure ring such that the first seal is inserted into the first circumferential groove without being substantially flexed,
wherein one of the packing nut and the pressure ring comprises a pin, and the other of the packing nut and the pressure ring comprises a groove, wherein the pin is inserted into the groove to couple the packing nut to the pressure ring, wherein the groove comprises an axial portion and a circumferential portion, and wherein the pin is positioned in the circumferential portion when the packing nut is coupled to the pressure ring.

2. The seal assembly of claim 1, wherein an outer surface of the packing nut defines:
a first axial shoulder configured to contact an outer axial end of the pressure ring; and
a second axial shoulder positioned radially-outward from the first axial shoulder.

3. The seal assembly of claim 2, wherein an inner surface of the packing nut defines a second circumferential groove that is configured to receive a second seal.

4. The seal assembly of claim 1, wherein the inner surface of the pressure ring defines a second circumferential groove that is configured to receive a second seal.

5. The seal assembly of claim 4, wherein the inner surface of the pressure ring also defines a first circumferential protrusion that is positioned axially-between the first and second circumferential grooves.

6. The seal assembly of claim 4, further comprising a nose ring that is configured to be coupled to the pressure ring, wherein the second seal is configured to be inserted into the second circumferential groove before the nose ring is coupled to the pressure ring such that the second seal is inserted into the second circumferential groove without being substantially flexed.

7. The seal assembly of claim 6, wherein an inner surface of the nose ring defines a third circumferential groove that is configured to receive a third seal.

8. The seal assembly of claim 7, wherein the inner surface of the nose ring also defines a second circumferential protrusion that is positioned axially-between the second and third circumferential grooves when the nose ring is coupled to the pressure ring.

9. The seal assembly of claim 1, wherein the pin is positioned in the circumferential portion when the packing nut is being de-coupled from a body of a pump.

10. A fluid end of a pump, comprising:
a body defining a plunger bore;
a plunger positioned at least partially within the plunger bore; and a seal assembly positioned at least partially radially-between the body and the plunger, wherein the seal assembly comprises:
a packing nut;
a pressure ring coupled to the packing nut, wherein an inner surface of the pressure ring defines a first circumferential groove that is configured to receive a first seal, wherein the first seal is configured to be inserted into the first circumferential groove before the packing nut is coupled to the pressure ring such that the first seal is inserted into the first circumferential groove without being substantially flexed, wherein one of the packing nut and the pressure ring comprises a pin, and the other of the packing nut and the pressure ring comprises a groove, wherein the pin is inserted into the groove to couple the packing nut to the pressure ring, wherein the groove comprises an axial portion and a circumferential portion, and wherein the pin is positioned in the circumferential portion when the packing nut is coupled to the pressure ring; and
a nose ring coupled to the pressure ring.

11. The fluid end of claim 10, wherein the inner surface of the pressure ring defines a second circumferential groove that is configured to receive a second seal, and wherein the second seal is configured to be inserted into the second circumferential groove before the nose ring is coupled to the pressure ring such that the second seal is inserted into the second circumferential groove without being substantially flexed.

12. The fluid end of claim 11, wherein the inner surface of the pressure ring also defines a first circumferential protrusion that is positioned axially-between the first and second circumferential grooves.

13. The fluid end of claim 11, wherein an inner surface of the nose ring defines a third circumferential groove that is configured to receive a third seal.

14. The fluid end of claim 13, wherein the inner surface of the nose ring also defines a second circumferential protrusion that is positioned axially-between the second and third circumferential grooves when the nose ring is coupled to the pressure ring.

15. The fluid end of claim 10, wherein an outer surface of the packing nut defines:
a first axial shoulder configured to contact an outer axial end of the pressure ring; and
a second axial shoulder positioned radially-outward from the first axial shoulder.

16. The fluid end of claim 10, wherein an inner surface of the packing nut defines a second circumferential groove that is configured to receive a second seal.

17. The fluid end of claim 10, wherein the pin is positioned in the circumferential portion when the packing nut is being de-coupled from the body.

18. A method for assembling a seal assembly, comprising:
inserting a first seal into a first circumferential groove formed in an inner surface of a pressure ring;
inserting an inner axial end of a packing nut at least partially into the pressure ring such that the first seal is positioned axially-between the inner axial end of the packing nut and a circumferential protrusion of the pressure ring;
coupling the packing nut to the pressure ring;
inserting a second seal into a second circumferential groove formed in the inner surface of the pressure ring; and
inserting an outer axial end of a nose ring at least partially into the pressure ring such that the second seal is positioned axially-between the outer axial end of the nose ring and the circumferential protrusion of the pressure ring.

19. The method of claim 18, further comprising:
inserting the seal assembly at least partially into a plunger bore of a fluid end of a pump; and
inserting a plunger through the seal assembly such that the first and second seals contact an outer surface of the plunger.

20. The method of claim 18, wherein the first seal is inserted into the first circumferential groove before the inner axial end of the packing nut is inserted at least partially into the pressure ring such that the first seal is inserted into the first circumferential groove without being flexed.

* * * * *